United States Patent
Heer et al.

(10) Patent No.: US 7,043,475 B2
(45) Date of Patent: May 9, 2006

(54) SYSTEMS AND METHODS FOR CLUSTERING USER SESSIONS USING MULTI-MODAL INFORMATION INCLUDING PROXIMAL CUE INFORMATION

(75) Inventors: Jeffrey M. Heer, Berkeley, CA (US); Ed H. Chi, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 593 days.

(21) Appl. No.: 10/248,136

(22) Filed: Dec. 19, 2002

(65) Prior Publication Data

US 2004/0122819 A1 Jun. 24, 2004

(51) Int. Cl.
*G06F 17/30* (2006.01)

(52) U.S. Cl. .......................................................... 707/6
(58) Field of Classification Search .................... 707/1, 707/2, 104.1, 3, 5, 6, 100; 345/738; 709/203, 709/224; 704/9
See application file for complete search history.

(56) References Cited

U.S. PATENT DOCUMENTS

| | | | | |
|---|---|---|---|---|
| 6,546,422 B1 * | 4/2003 | Isoyama et al. | ............ | 709/225 |
| 2002/0174101 A1 * | 11/2002 | Fernley et al. | .................. | 707/1 |
| 2003/0212760 A1 * | 11/2003 | Chen et al. | ................. | 709/218 |
| 2004/0012625 A1 * | 1/2004 | Lei et al. | .................... | 345/738 |
| 2004/0054713 A1 * | 3/2004 | Rignell et al. | .............. | 709/203 |

OTHER PUBLICATIONS

Paper 2001 01 24 SIAM Data mining MMC2.*
Ed. H. Chi et al., "Using Information Scent to Model User Information Needs aand Actions on the Web", *SIGCHI'01*, Mar. 31-Apr. 4, 2001, Seattle, Washington.
Heer, Jeffrey et al., "Identification of Web User Traffic Composition Using Multi-Modal Clustering and Information Scent", In proceedings of the Workshop on Web Mining, SIAM Conference on Data Mining, pp. 51-58, Apr. 7, 2001, Chicago, IL.

* cited by examiner

Primary Examiner—Etienne P. LeRoux
(74) Attorney, Agent, or Firm—Oliff & Berridge, PLC

(57) ABSTRACT

Techniques for clustering user sessions using multi-modal information including proximal cue information are provided. The topology, content and usage of a document collection or web site are determined. User paths are then identified using longest repeating subsequence techniques. An information need feature vector is determined for each significant user path. Further, other feature vectors and proximal cue vectors for each document or web page in the significant path are determined. The other feature vectors include a content feature vector, a uniform resource locator feature vector, an inlink feature vector and an outlink feature vector, among others. The feature vectors and the proximal cue vectors are combined into a multi-modal vector that represents a user profile for each significant user path. The multi-modal vectors are clustered using a type of multi-modal clustering such as K-Means or Wavefront clustering.

18 Claims, 11 Drawing Sheets

SYSTEMS AND METHODS FOR CLUSTERING USER SESSIONS USING MULTI-MODAL INFORMATION INCLUDING PROXIMAL CUE INFORMATION

GOVERNMENT LICENSE PROVISION

The U.S. Government has a paid-up license in this invention and the right in limited circumstances to require the patent owner to license others on reasonable terms as provided for by the terms of Contract No. N00014-96-C-0097 awarded by the Office of Naval Research.

BACKGROUND OF THE INVENTION

1. Field of Invention

This invention relates to systems and methods for navigating through and searching for sites on a distributed network.

2. Description of Related Art

Increasingly, the World Wide Web has become the information repository of choice for both corporations and individual users. The ubiquity of World Wide Web browsers and the push by many corporations to adapt commercial off-the-shelf (COTS) technology have all helped the World Wide Web become the delivery option for most information systems.

To this effect, web site designers and information architects have endeavored to identify the types of users traversing their document collections or web sites. This information is then used to tailor the delivery of information based on the user's needs and the tasks the user performs. A user's access patterns of a document collection and/or one or more web sites may be determined using conventional access information and/or special instrumentation added to client access software.

For example, the Toolbar™ 5.0 system from Alexa Internet™ provides a customized toolbar that is added to the client browser. Using the Toolbar™ 5.0 product, a user of this system is able to compile information regarding a site visitor's path and make suggestions of a next connection based on the similarity of the current path to accumulated historical browsing information. Similarly, the SurfAid™ product from IBM® uses on-line analytical processing methods to provide a user of this product with counts of users following traversal paths. This system then attempts to assign each user path to a user path category.

SUMMARY OF THE INVENTION

However, none of these products identify user types based on the multiple modes of information that are available. Accordingly, systems and methods for clustering user sessions using multi-modal information including proximal cue information would be advantageous.

This invention provides, devices, systems and methods for clustering user sessions using multi-modal information and proximal information.

In various exemplary embodiments, a plurality of user paths are selected in a collection of content portions. In various exemplary embodiments, for each path, the multi-modal information for content portions associated with the user path is determined. In various exemplary embodiments, the proximal information for content portions associated with the user path is determined. In various exemplary embodiments, the multi-modal information for content portions and the proximal information for content portions associated with the user path are combined to form a user profile. In various exemplary embodiments, the multi-modal information and proximal information of user profiles are clustered based on similarity.

In various exemplary embodiments, determining proximal information includes analyzing portions of a text associated with a link between content portions along the user path. In various exemplary embodiments, determining proximal information includes analyzing portions of a text associated with an image link between content portions along the user path.

In various exemplary embodiments, the longest repeating subsequence is used to select the plurality of user paths. In various exemplary embodiments vectors are used to represent multi-modal information and proximal information. In various exemplary embodiments, the vectors representing multi-modal information are weighted. In various exemplary embodiments, the vectors representing the proximal information are weighted. In various exemplary embodiments, the content portion in the user path is weighted based on content portion access frequency. In various exemplary embodiments, the content portion in the user path is weighted based on content portion position in the user path.

In various exemplary embodiments, the multi-modal information and the proximal information are clustered using at least one of K-Means clustering and Wavefront clustering.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with references to the following figures, wherein.

DETAILED DESCRIPTION OF EXEMPLARY EMBODIMENTS

Figure 1:
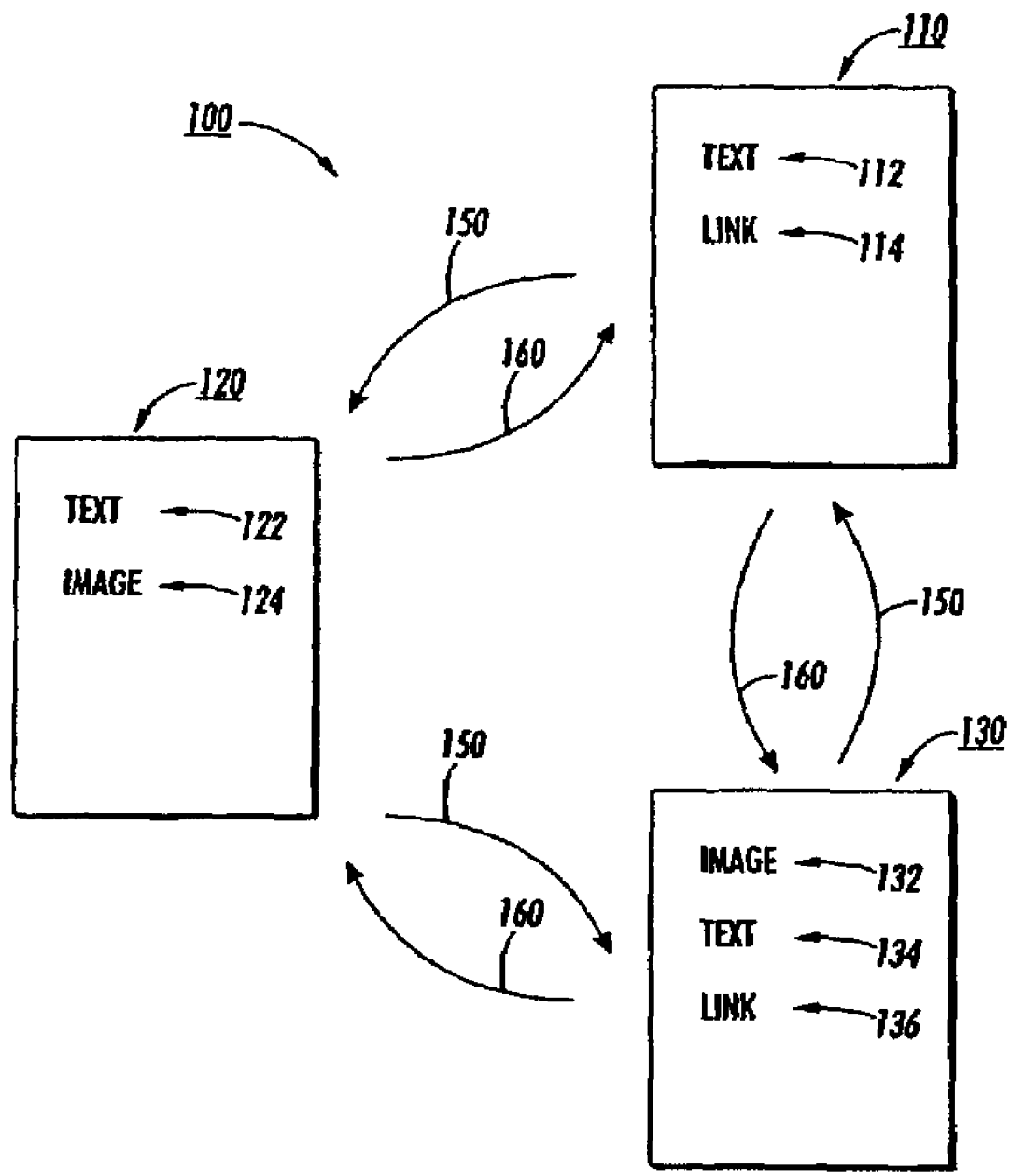
FIG. 1 illustrates a plurality of content portions connected by connections in a collection of content portions.

FIG. 1 illustrates a collection 100 of content portions 110, 120 and 130 connected together by connections 150 and 160. The content portions may be documents, web pages and so forth. For the purposes of illustration, only three content portions are shown, however the number of content portions may vary dependent on the collection 100 in which the various embodiments of this invention are being implemented. It should be appreciated that the connections 150 and 160 can be wired or wireless connections to a network (not shown). The network can be a local area network, a wide area network, an intranet, an extranet, or any distributed processing and storage network. For the purposes of illustration, in this case, the network is the Internet.

In FIG. 1, the content portions 110, 120 and 130 may be web pages in the Internet. Each content portion 110, 120 and 130 contains one or more contents that may be of interest to a user of the content portion. For example, the content portion 110 may contain an interesting text 112. Further, the content portion 110 may contain a link 114 which when "clicked" may connect the user to another content portion, for example, to content portion 120 having related contents. The content portion 120 may further contain a text 122 and an image 124. The image 124 may be a pictorial representative of one or more contents in another content portion, for example, the content portion 130. If the user clicks the image 124, the user is provided with the content portion 130 having, for example, the image 132, which was represented by the image 124, and perhaps an explanatory text 134 and another related link 136. The links 114 and 136, the representative image 124 typically contain a uniform resource locator (URL) which provides the "address" of the content portion to be connected to via the Internet. From the reference of a content portion, a link that sends the user to another content portion is defined as an "outlink" and a link that brings the user to the content portion is defined as an "inlink."

Figure 2:
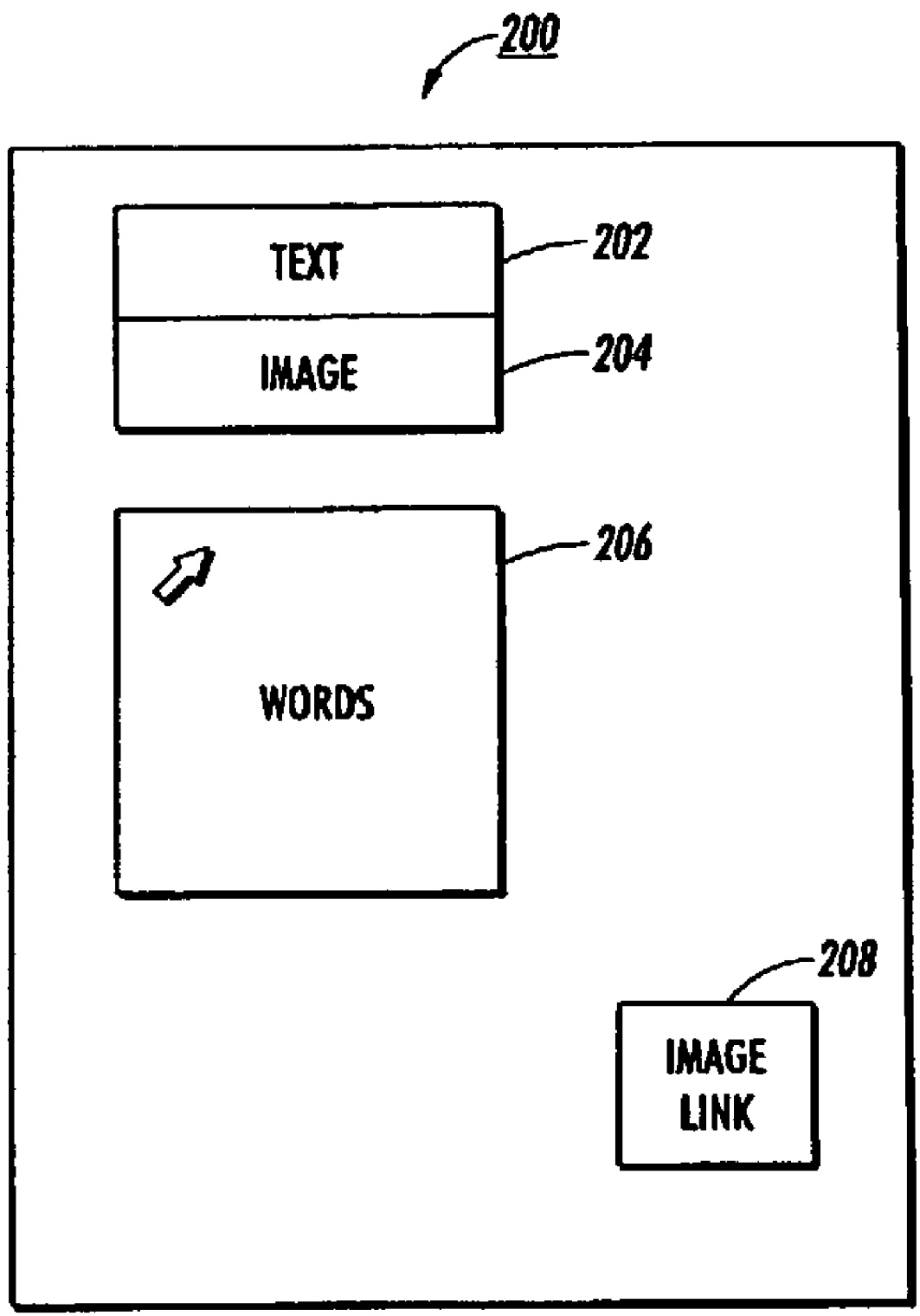
FIG. 2 illustrates a link and the proximal terms in a typical document or web page.

FIG. 2 illustrates various exemplary links and proximal terms in a typical content portion 200. Proximal terms represent information cues that convey information to the simulated user. For example, a text 202 associated with a link 204 may provide proximal cues as to the nature of the linked information. The proximal cue words may include portions of the text 202 surrounding the link 204. So, for example, if the text 202 says "Buy a gift certificate", then the words "buy", "a", "gift", and "certificate" are used as words that describe the proximal cues. If the link 204, in addition, have words 206 near it that says "click here to purchase gift certificates that are discounted", then these words 206 are also used to describe the proximal cues. If the link 204 is in typical Uniform Resource Locator (URL) form, the punctuation and "/" characters associated with the URL are used to define word boundaries. For example, if the link 204 such as, for example, "http://www.xerox.com/products/support/index.html" is processed, the words http, www, xerox, com, products, support and index are considered as proximal cue words for the relevant link 204. In various alternative embodiments, additional weighting factors may be added to the proximal cue word information, such as the location of the link within the document or web page. For example, weighting factors may accord higher importance to proximal cue words that appear higher up in the structure of a content portion. It will be apparent that the proximal cue words can be weighted using any known or later developed technique for weighting in the practice of the invention.

If the content portion 200 has an image link 208 such as a GIF, JPEG, PNG, BMP or any other image file type, the number of proximal cue words derivable from the link may be limited or non-existent. In addition, determining proximal cue words for image links is a challenge. If the image is analyzed, a large increase in processing time and required resources will result. Also, determining the meaning or semantics of an image based on image analysis may be an extremely complicated and error prone process. However, for example, as web site developers attempt to improve the navigability of their web sites, the use of image links is increased. Accordingly, it is desirable to include image links when determining the proximal cues to which a simulated or objective user responds.

FIG. 2 illustrates various exemplary links and proximal terms in a typical content portion 200. Proximal terms represent information cues that convey information to the simulated user. For example, a text 202 associated with a link 204 may provide proximal cues as to the nature of the linked information. The proximal cue words may include portions of the text 202 surrounding the link 204. So, for example, if the text 202 says "Buy a gift certificate", then the words "buy", "a", "gift", and "certificate" are used as words that describe the proximal cues. If the link 204, in addition, have words 206 near it that says "click here to purchase gift certificates that are discounted", then these words 206 are also used to describe the proximal cues. If the link 204 is in typical Uniform Resource Locator (URL) form, the punctuation and "/" characters associated with the URL are used to define word boundaries. For example, if the link 204 is processed, typical words such as http, www, Xerox, com, products, support and index are considered as proximal cue words for the relevant link 204. In various alternative embodiments, additional weighting factors may be added to the proximal cue word information, such as the location of the link within the document or web page. For example, weighting factors may accord higher importance to proximal cue words that appear higher up in the structure of a content portion. It will be apparent that the proximal cue words can be weighted using any known or later developed technique for weighting in the practice of the invention.

In various exemplary embodiments, the linked to or distal information used may include the distal content portion title and the content portion text, either alone or in combination with proximal cue information such as the cue words from the text surrounding the image link.

Figure 3:
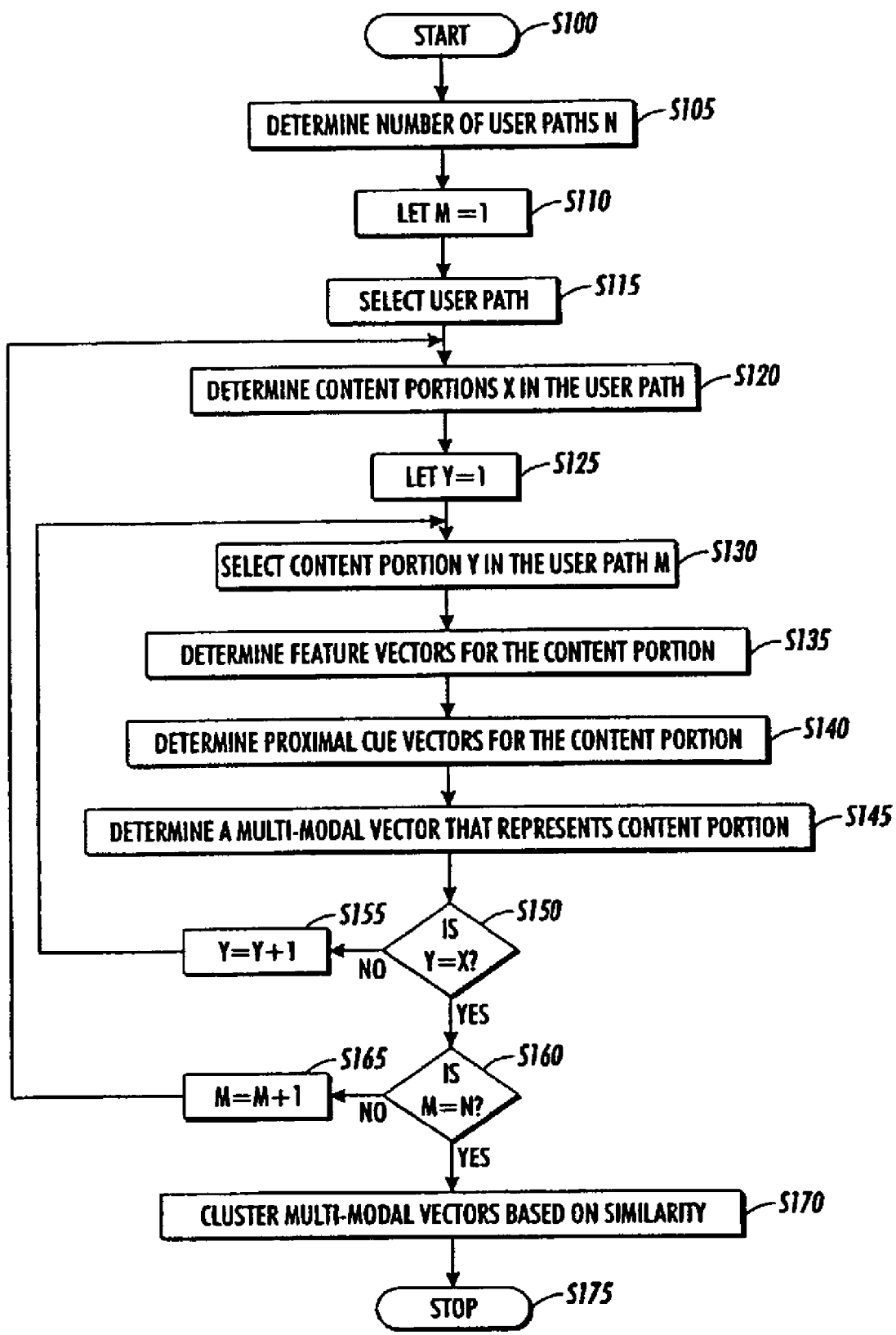
FIG. 3 is a flowchart of one exemplary embodiment of a method for clustering user sessions using multi-modal information including proximal information according to this invention.

FIG. 3 shows a flowchart of an exemplary embodiment of a method for clustering user sessions using multi-modal information including proximal cue information according to this invention. The process starts at step S100 and continues immediately to step S105 where user path information is determined, for example, by using longest repeating subsequence techniques. Once significant user paths have been identified, which is represented by the integer N, the process continues to step S110 where a counter M is set to one and the process continues to step S115 where the first user path is selected.

In step S120, the number of content portions, which is represented by an integer X, for the user path is determined. In step S125, a second counter Y is set at one and the process continues to step S130 where a first content portion is selected.

In step S135, the feature vectors (multi-modal information) for the selected content portion are determined. In various exemplary embodiments, the feature vectors include the content feature vector, the uniform resource locator feature vector, the inlink feature vector and the outlink feature vector for the content portion. The process continues to step S140 where the proximal cue vectors associated with the content portion are determined. In step S145, the feature vectors and the proximal cue vectors are concatenated to form a single multi-modal vector that represents the content portion.

The process continues to step S150 where a determination is made as to whether the counter Y has reached the maximum number content portions in the user path. If the counter Y has not reached the maximum number, then the process continues to step S155 where the counter Y is incremented and the process returns to step S130 to repeat the steps S130 to S150. Otherwise if the counter Y has reached the maximum number, the process continues to step S160.

In step S160, a determination is made as to whether the counter M has reached the maximum number of user paths identified in step S105. If the counter M has not reached the maximum number, then the process continues to step S165 where the counter M is incremented and the process returns to step S120 to repeat the steps S120 to S160. Otherwise if the counter M has reached the maximum number, the process continues to step S170.

In step S170, statistical analysis is performed on the multi-modal vectors generated during the steps S105 to S165 and the multi-modal vectors are clustered based on similarity. The process then continues to step S175 when the process terminates.

In various exemplary embodiments, when a user views a content portion, such as a document or web page, of the content portion collection, such as a document collection or web site, through a document or web server, the user's machine identification information, "referred by document", "referred to document", browser type and date and time are saved in the document server or web server access information. As the user traverses the site from an initial entry page, a user path is generated in the access information. The path is identified by the machine identification information and indicates the previous document or web page and current document or web page in the "referred by document field" and the "referred to document field" of the document server or web server access information.

In various exemplary embodiments, the value of a given position in the information need keyword vector indicates how relevant the associated keyword is to the user path. For the exemplary vector B having the following six entries, [1 2 5 99 1 50], the vector positions 4 and 6 represent the two most relevant keywords. These vector positions might, for example, represent "chocolate" and "souflee".

In various exemplary embodiments, the constituent words may be weighted according to any known or later developed technique for weighting. For example, Term Frequency by Inverse Document Frequency (TF.IDF) weighting may be used. TF.IDF is an information retrieval technique that calculates term importance of a word by weighting the word based on how frequently it occurs in the document collection or web site. Further information on TF.IDF is found in Schuetz, H. et al., "Foundations of Statistical Natural Language Processing," Cambridge, MA:MIT Press, 1999. The content information is then represented in the form of a content feature vector.

In various exemplary embodiments, the URLs are broken into constituent words and the words are weighted according to frequency. For example, a URL such as "http:www.xerox.com/index.html" is broken up into the words "http", "www", "xerox", "com", "index" and "html". A vector describing the weighted presence of the words appearing in the URLs is determined.

In various exemplary embodiments, the proximal cue feature vector, the content feature vector, the URL feature vector, the inlink feature vector, the outlink feature vector and the information need feature vector for each document or web page on the user path are combined using the document or web page path position and document access weighting. The combined multi-modal vector represents a user profile and can be represented as:

$$\text{User Profile} = \sum_{d=1}^{N} SiPd$$

where Si are the Sessions Weights and Pd the feature vectors including proximal cue vectors. The multi-modal vector allows different types of information representing the document collection to be combined and operated upon using a unified representation.

Figure 4:
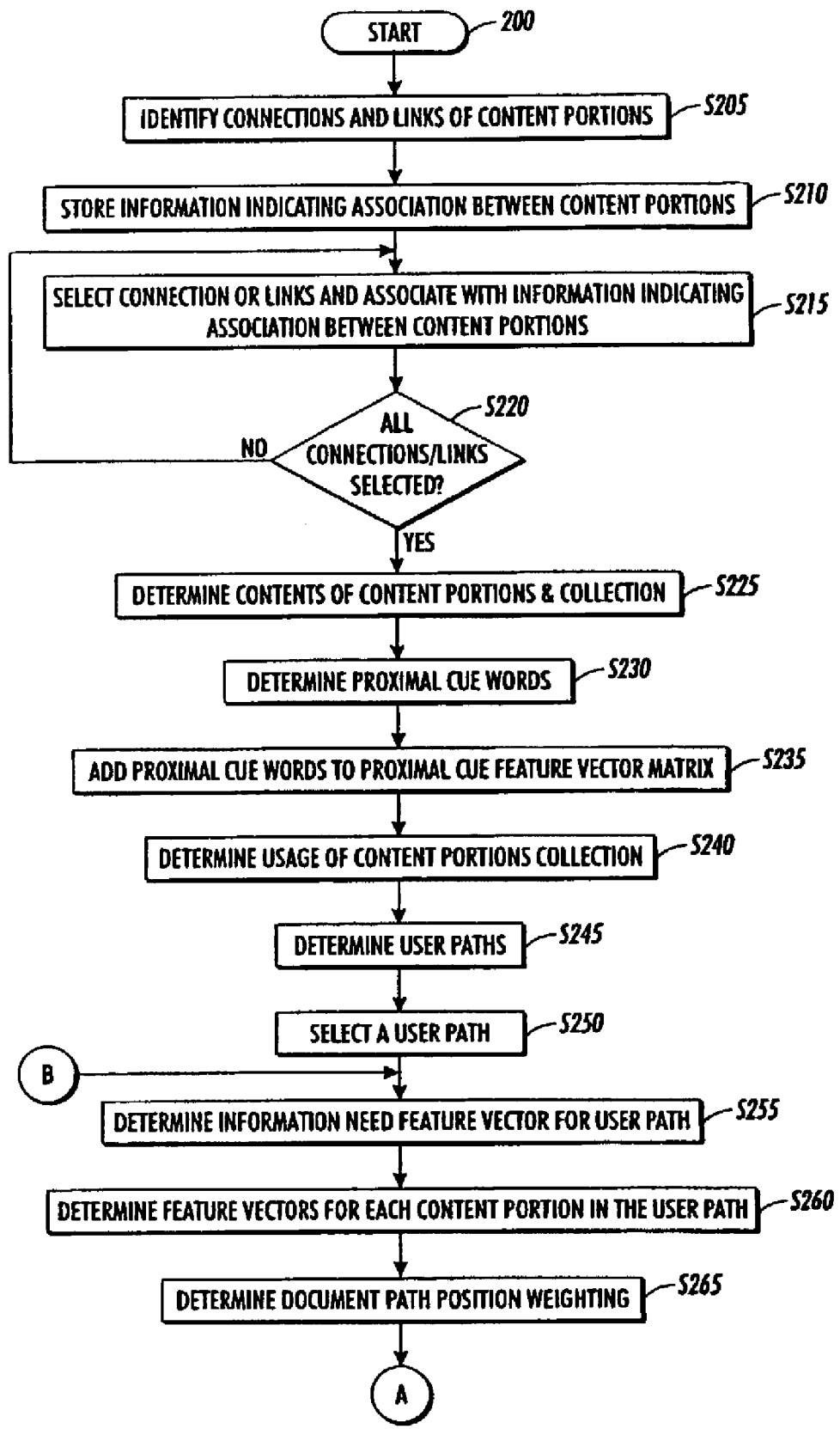
FIGS. 4 and 5 are a flowchart of one exemplary embodiment of a method for determining user profiles of content portions of user paths according to this invention.
Figure 5:
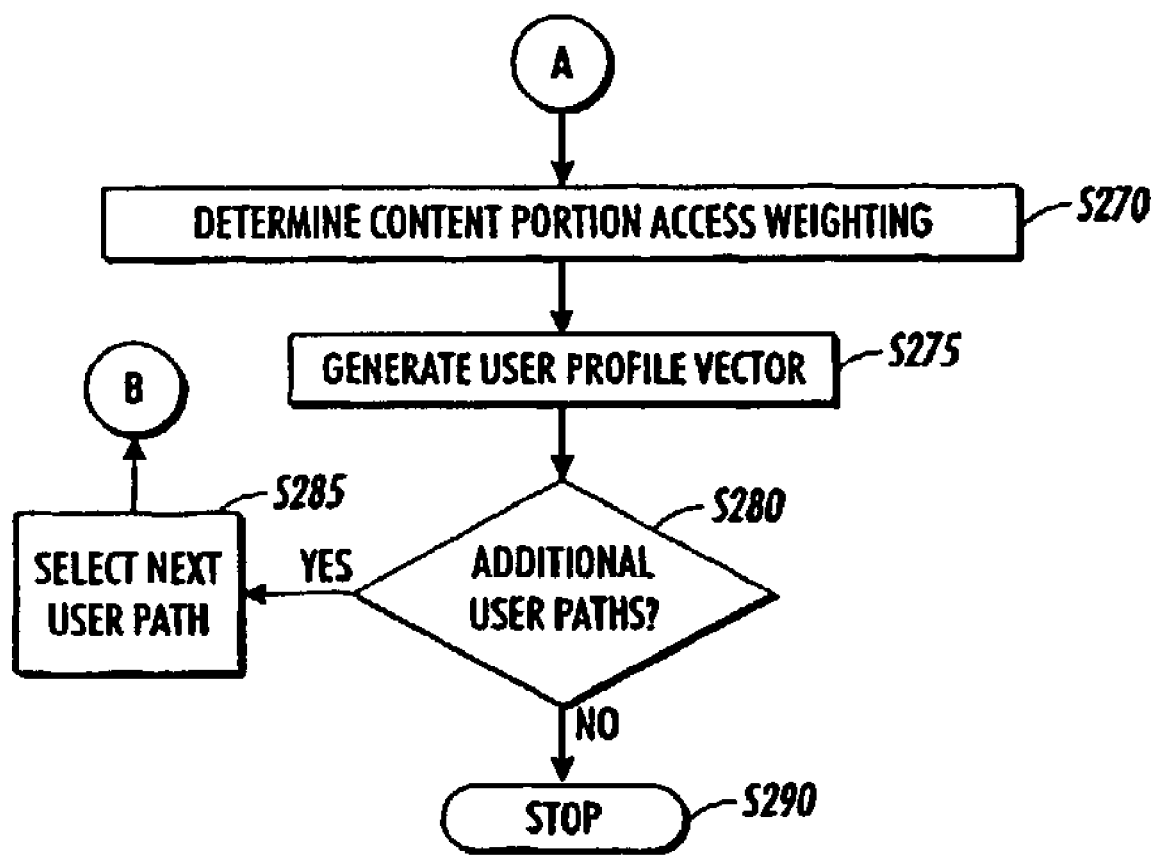

FIGS. 4–5 show a flowchart of an exemplary embodiment of a method for determining user profiles of content portions of user paths according to the invention. The process starts at step S200 and continues immediately to step S205 where a topology of the content collection is determined. The topology may be determined by traversing the collection and identifying connections or links between content portions. For example, starting at a first content portion, the content portions connected to, or linked to the first content portion are determined.

In step S210, information indicating an association between the first content portion and the reachable content portions is stored in a topology data structure. It will be apparent that a topology data structure may include a topology matrix, a topology adjacency list or any other known or later developed technique of storing topology information about the content portions in the content collection. In step S215, a connected to, or linked to content portions are then selected. The connection or link of the connected to, or linked to content portions is then identified and the information indicating the association between the connected to, or linked to content portions is stored in the topology matrix. Continual looping may be avoided by maintaining a list of content portions already visited.

In step S220, a determination is made as to whether all connected to or linked to content portions reachable via a threshold number of traversals from the initial content portion have been identified. If not, then in step S220 the next connected to or linked to is selected and the process returns to step S215 to repeat the steps S215 to S220. Otherwise, if in step S220, it is determined that all connected to, or linked to have been identified, the process continues to step S225.

In step S225, the contents of each of the content portions, making up the content collection are determined. The words on each content portions are added to a word/document frequency matrix. The weights of the words are determined and a weighted word document frequency matrix is created. The weighting may use TF.IDF, log of the term frequency, $1+(\log_{10}$ of the term frequency) or any other known or later developed technique of weighting. The process then continues to step S230.

In step S230, connections or links identified in steps S205 to S220 are analyzed for proximal cue words. In step S235, the proximal cue words are added as proximal cue feature vectors to a proximal cue feature vector matrix. The proximal cue feature vector matrix stores information about which proximal cue feature vectors are associated with which links. The vectors in the proximal cue feature vector matrix may be weighted, for example, using TF.IDF, log of the term frequency, 1+(log$_{10}$ of the term frequency) or any other known or later developed technique of weighting. The process then continues to step S240.

In step S240, the usage of the content portions collection is determined by, for example, analyzing the document server or web server access information. The document server or web server access information indicates the connected to, or linked to content portion which a user used to traverse into the collection, the connected to, or linked to content portion, the date and time as well as machine address information. Information about the type and/or version of the user's browser may also be recorded. The process then continues to step S245.

In step S245, significant usage information including user path information is determined using the longest repeating subsequence techniques. As an example, a longest repeating sub-sequence of content portions can be a sequence of consecutive content portions accessed by a user and where each content portion appears at least some number of times greater that is than a threshold level, and/or the sequence appears at least twice. Once the significant user paths have been determined using the longest repeating sequence techniques, the process continues to step S250 where the first of the determined user paths is selected. The process then continues to step S255.

In step S255, the information need associated with the selected user path is determined. The information need may be determined using co-pending application Ser. No. 09/540, 063, which is incorporated herein by reference in its entirety. It will be apparent that the information need may be determined using any known or later developed technique of determining user information need. The determination of information need accepts a user path and indicates the user information need for the path by returning a weighted group of keywords describing the user information need. The weighted group of keywords reflecting the information need is stored as an information need feature vector for the user path. The process then continues to step S260.

In step S260, the feature vectors for each content portion in the user path are determined. The feature vectors may include content feature vectors, URL feature vectors, inlinks feature vectors, outlinks feature vectors and so forth.

In step S265, a content portion path position weighting is determined. The path position weighting may for example adjust the weighting to provide a greater weighting for content portion information appearing later in the path under the assumption that information accessed farther along a path more closely reflects the user's information needs.

In step S255, the information need associated with the selected user path is determined. The information need may be determined using co-pending application Ser. No. 09/540, 063, filed Mar. 31, 2000, which is incorporated herein by reference in its entirety. It will be apparent that the information need may be determined using any known or later developed technique of determining user information need. The determination of information need accepts a user path and indicates the user information need for the path by returning a weighted group of keywords describing the user information need. The weighted group of keywords reflecting the information need is stored as an information need feature vector for the user path. The process then continues to step S260.

In step S275, the proximal cue feature vector, the content feature vector, the URL feature vector, the inlink feature vector, the outlink feature vector and the information need feature vector for each content portion on the user path are combined using the content portion path position and content portion access weighting. The combined multi-modal vector represents all of the features of the user path in a unified representation. The process then continues to step S280.

In step S280, a determination is made whether additional user paths remain to be processed.

If a determination is made that additional user paths remain to be processed, the process continues to step S285 where the next user path is selected and the process returns to step S255 where the process repeats. Otherwise, if at step S280, it is determined that no additional user paths remain to be processed, the process continues to step S290 where the process terminates.

In various exemplary embodiments, the topology matrix data structure may be developed automatically. In various exemplary embodiments, the information for the topology matrix data structure may be supplied by any other tool or utility such a web crawler or the information may be provided by the web site designer. The topology matrix represents the content portions that can be reached from an initial starting document or page.

In various exemplary embodiments, proximal cue words include for example, the text of the link structure. For links including characters such as '/' and '.', the characters may be used as word boundary markers and each portion of the text added to the list of proximal cue words. Text surrounding the link structure, the title of the proximal page as well as features such as where the link is found within the document may also be analyzed for proximal cue words. It will be apparent that any feature of the proximal document or web page may be used to provide proximal cue words in the practice of this invention. If the link structure is an image, proximal cue words surrounding a link frequently provide some cue words. In various exemplary embodiments, proximal cue words for the image is determined from text surrounding the link, the title of the document containing the image, image filename and the like.

In various exemplary embodiments, the machine address information can be used to provide an indication of the path of users between the documents or web pages identified in the document server, or web server access information. The user path information may be further analyzed using the techniques described in Pitkow et al., "Mining Longest Repeating Sub-sequences To Predict World Wide Web Surfing" in Proceedings of USITS' 99: The $2^{nd}$ USENIX Symposium on Internet Technologies and Systems, USENIX Association, 1999; and Pirolli et al. "Distributions of Surfers' Paths Through the World Wide Web: Empirical Characterization", World Wide Web 2(1–2):29–45 each incorporated herein by reference in its entirety.

In various exemplary embodiments, a content feature vector reflects the content of the words contained by each document or web page in the path. In various exemplary embodiments, a URL feature vector reflecting words within the URLs contained by each document or web page. The "/"and "." contained within URLs are used to define word boundaries. In this way, the word content of the URLs may be determined.

In various exemplary embodiments, an inlinks multi-modal feature vector indicates the inward connections or inlinks into each of the documents or web pages along the selected user path. The inward connections or inlinks are determined by, for example, examining the topology data structure of the document collection or web site and identifying which documents or web pages have entries indicating a link into the selected document or web page along the selected user path. Similarly, an outlinks feature vector indicates outward connections or outlinks for each document or web page along the selected user path. It will be apparent that any other set of known or later identified features of a document or web page may be used to determine feature vectors.

In various exemplary embodiments, a mathematical function assigning asymptotically greater weight to information appearing later along the path or any other known or later developed technique may be used to provide path position weighting according to this invention.

In various exemplary embodiments, a document weighting function might lower the weighting associated with a document or web page that is accessed by every user path under the assumption that the document or page is a splash screen or entry document or web page that every user of the site must visit to start the user path traversal.

Figure 6:
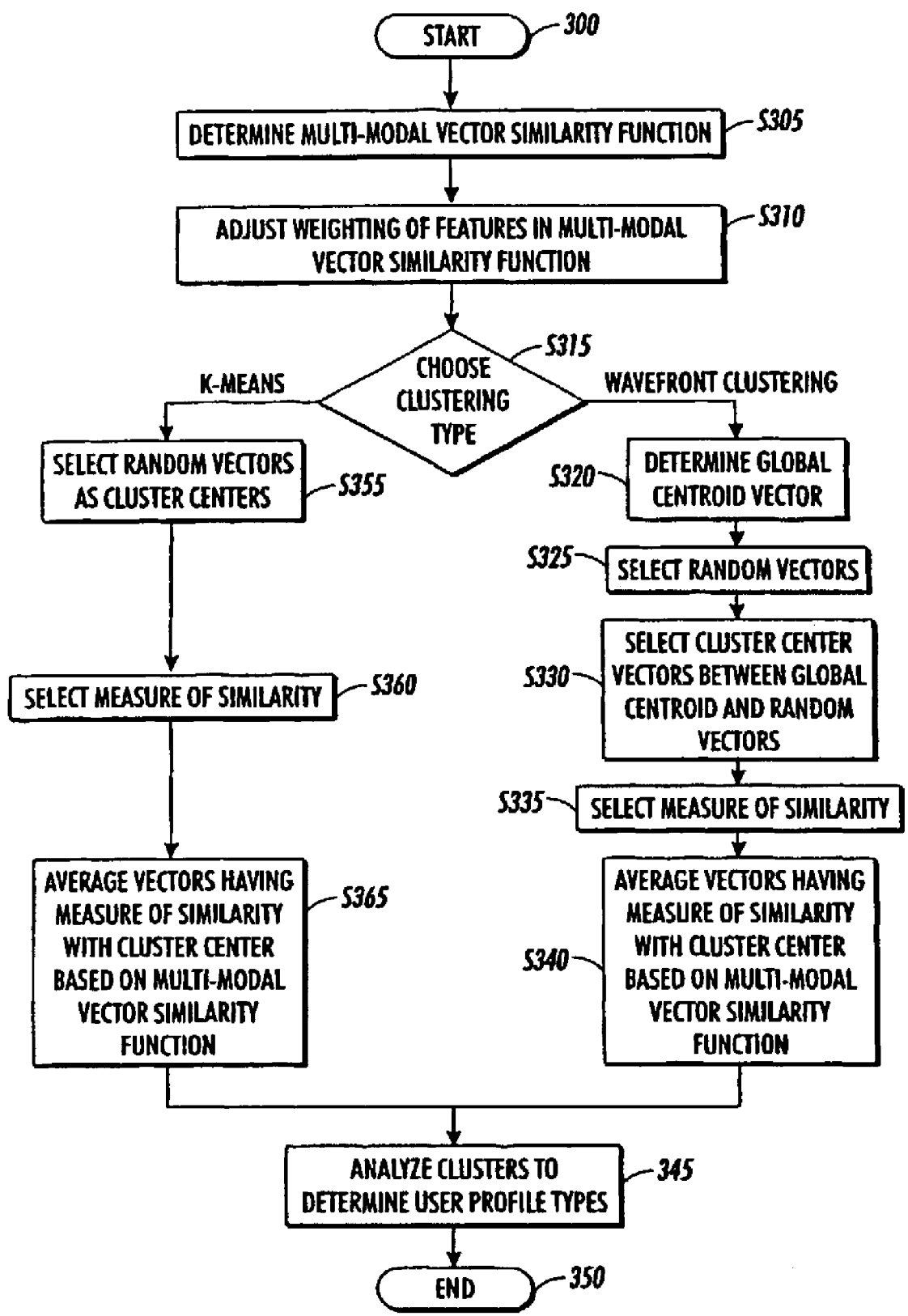
FIG. 6 is a flowchart of one exemplary embodiment of a method for clustering user sessions according to this invention.

FIG. 6 shows a flowchart of an exemplary embodiment of a method for clustering user sessions according to the invention. The process starts at step S300 and continues immediately to step S305 where a similarity function is performed. Since each of the feature vectors and the proximal cue vectors define a unique dimensional space, consecutive feature vectors and proximal cue vectors may be transformed to occupy a new dimensional space having a number of dimensions equal to the sum of the number of dimensions of each feature vector and proximal cue vector. In this way, dissimilar information may be aggregated and compared using the vectors. Accordingly, a similarity function may be defined to be the cosine of the angle between any two feature vectors and any two proximal cue vectors in this new dimensional space. However, it will be apparent that any known or later developed method of determining the similarity between vectors may be used according to this invention.

In step S310, the weighting of the feature vectors and the proximal cue vectors is determined.

For example, in some situations it may be desirable to assign a greater weighting to the content features than to the URL features. Similarly, at other times, it be desirable to assign a greater weighting to the inlink and outlink features. Once the weighting of the feature vectors and proximal cue vectors is determined the process continues to step S315 where the type of clustering to be performed is determined.

In the exemplary embodiment according to this invention, a choice between K-Means clustering and Wavefront clustering is determined. Multi-Modal Clustering is further discussed in application Ser. No. 09/820,988 incorporated herein by reference in its entirety. However, it will be apparent that any known or later-developed type of clustering, such as hierarchical clustering, may be used according to this invention.

If the determination is made at step S315 that wavefront clustering is to be used, then the process continues to step S320. In step S320, a global centroid cluster is determined. The process then continues to step S325.

In step S325, some N random vectors are selected. N can be user specified. The process then continues to step S330 where cluster centers are selected between each random vector and the global centroid. The process then continues to step S335 where a measure of similarity between the vectors is selected.

In step S335, the measure of similarity may be user selected using a drop down dialog box, pop-up dialog box or any other known or later developed technique for entry of the measure of similarity value. In various alternate embodiments of this invention, the similarity value may be a default value changeable by the user. After selection of the measure of similarity value, the process continues to step S340.

In step S340 the feature vectors and the proximal cue vectors having the selected measure of similarity with the cluster center vectors based on the feature vector and the proximal cue vector similarity function are averaged. The process then continues to step S345 where the cluster centers vectors are analyzed to determine user profile types.

In the exemplary embodiment according to this invention, a choice between K-Means clustering and Wavefront clustering is determined. Multi-Modal Clustering is further discussed in application Ser. No. 09/820,988, filed Mar. 30, 2001, incorporated herein by reference in its entirety. However, it will be apparent that any known or later-developed type of clustering, such as hierarchical clustering, may be used according to this invention.

However, if it is determined in step S315 that K-Means clustering should be used, the process continues to step S355 where random vectors are selected as cluster centers. The process then continues to step S360.

In step S360 a measure of similarity is selected. As discussed above, the measure of similarity may be selected using any known or later developed method of determining user input such as pop-up dialog box and field entry. The measure of similarity may be a default value that may be overridden be a user. Once the measure of similarity is selected the process continues to step S365 where the average of all vectors having the selected measure of similarity with each of the cluster centers, based on the multi-modal vector and proximal cue vector similarity function is determined.

The average may be performed by summing each individual vector and then dividing the sum by the number of total number of vectors or any other known or later developed methods. The process then continues to step S350 where the user profile types are determined by analyzing the cluster center vectors.

Figure 7:
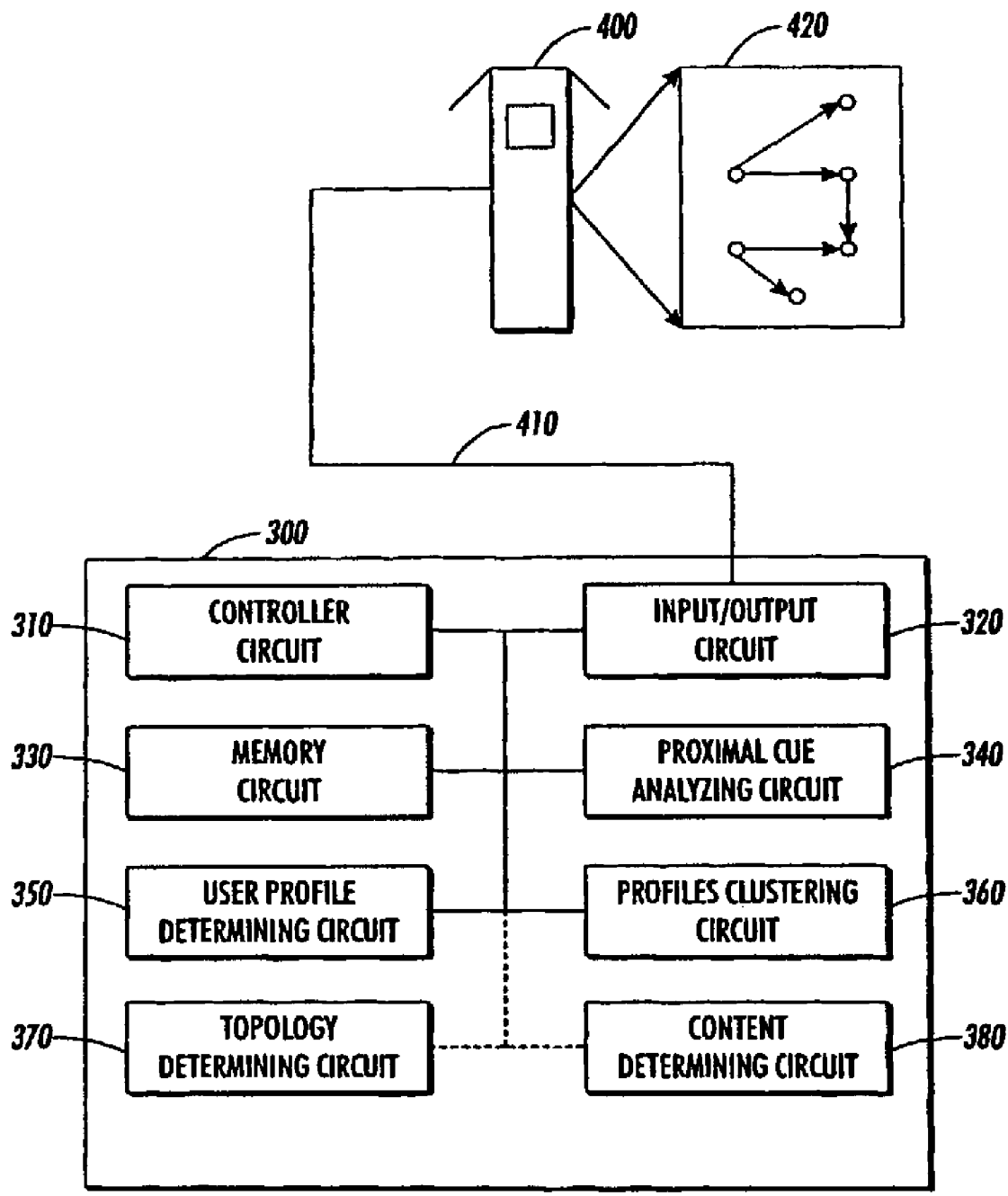
FIG. 7 is an exemplary embodiment of a system for clustering user sessions using multi-modal information including proximal information according to this invention.

FIG. 7 shows an exemplary embodiment of a system 300 that clusters user sessions using multi-modal information including proximal cue information. As shown in FIG. 7, the system 300 includes a controller circuit 310, an input/output circuit 320, a memory circuit 330, a proximal cue analyzing circuit 340, a user profile determining circuit 350 and a profiles clustering circuit 360. In the illustrative embodiment, the system 300 is connected via communications link 410 to a document collection server or web server 400. The document collection or web server 400 provides access to documents or web pages in the document collection or web site 420.

The system 300 may store in the memory circuit 330 the connections or links between each document or web page of the document collection or web site 420 as well as the contents of each of the retrieved documents or web pages. Alternatively, the system 300 includes a topology determining circuit 370 and a content determining circuit 380. The controller circuit 310 activates the topology determining circuit 370 to retrieve each document or web page of the document collection or web site 320 through the document server or web server 400 over the communications link 410 and the input/output circuit 320. The retrieved documents or web pages are analyzed to determine the connections or links between each document or web page of the document collection or web site 420. The topology information is then stored in a topology storage data structure in the memory circuit 330. It will be apparent that the topology data structure may be a matrix structure, adjacency list or any other known or later developed technique for storing information about the connection or link information between documents or web pages.

The content determining circuit 380 determines the contents of each of the retrieved documents or web pages. For example, in one exemplary embodiment, the words in each document or web page and their frequency of occurrence is determined by the content determining circuit 380. It will be apparent that the content determining circuit 380 may be activated as each document or web page is retrieved by the topology determining circuit 370 or may be activated after the topology of the document collection or web site has already been determined.

The proximal cue analyzing circuit 340 analyzes each link or connection on a document or web page including their contents for proximal cues that convey information to a user. The user profile determining circuit 350 determines information obtained from user sessions and documents or web pages, and further receives and determines the proximal cues related to the documents or web pages from the proximal cue analyzing circuit 340 to generate one or more user profiles. The profiles clustering circuit 360 analyzes the user profiles for shared similarity and cluster information based on the shared similarity. It will be apparent that the proximal cue analyzing circuit 340 may be activated as each document or web page is retrieved by the topology determining circuit 370 or may be activated after the topology of the document collection or web site has already been determined. The proximal cue analyzing circuit 340 breaks the link or connection down into constituent words. Entries reflecting the presence of the proximal cues are then stored in a proximal cue word matrix in the memory circuit 330.

Figure 8:
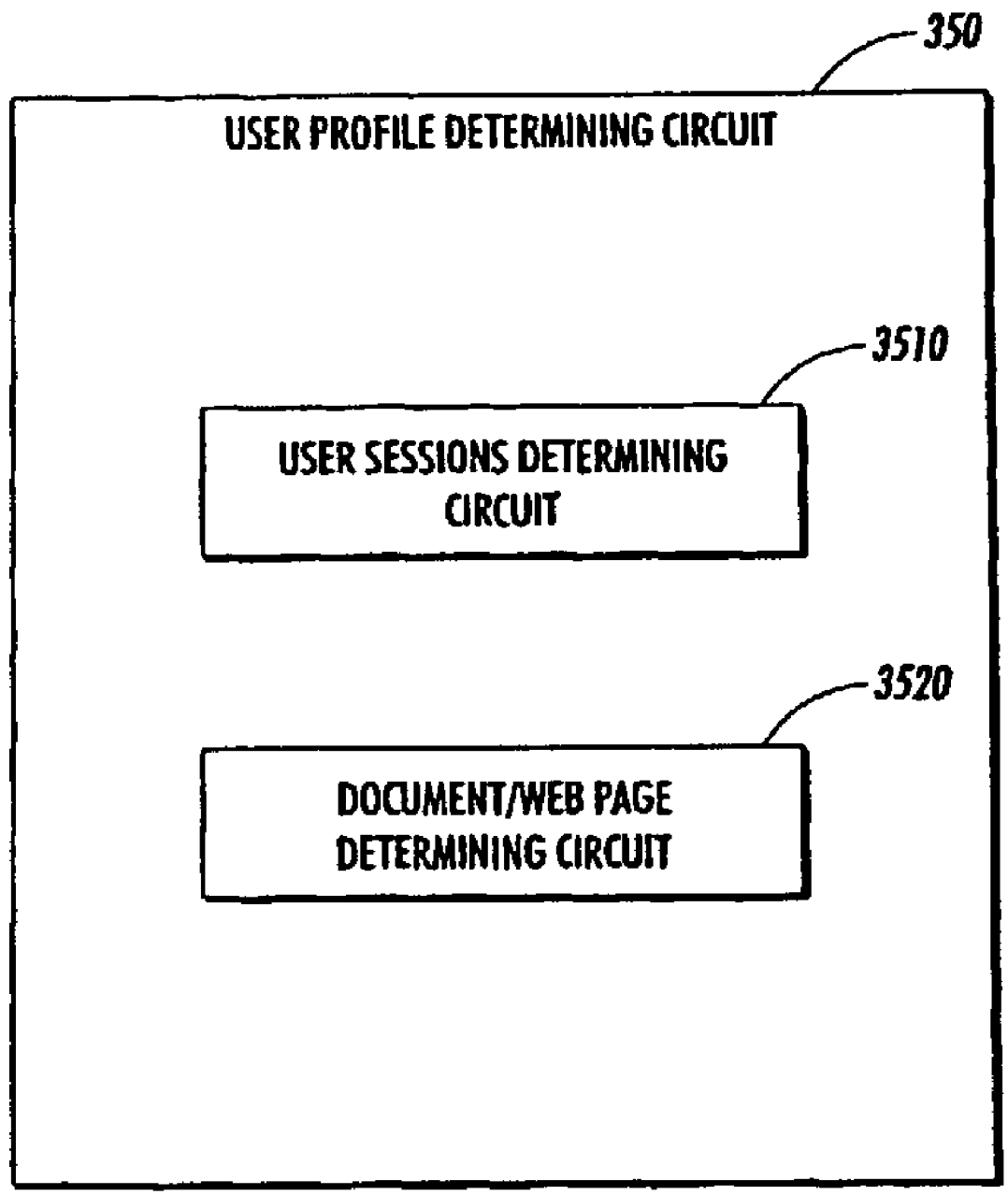
FIG. 8 is an exemplary embodiment of a user profile determining circuit according to this invention.

FIG. 8 shows in greater detail one exemplary embodiment of the user profile determining circuit 350 according to the invention. The user profile determining circuit 350 includes a user sessions determining circuit 3510 and a document/web page determining circuit 3520.

Figure 9:
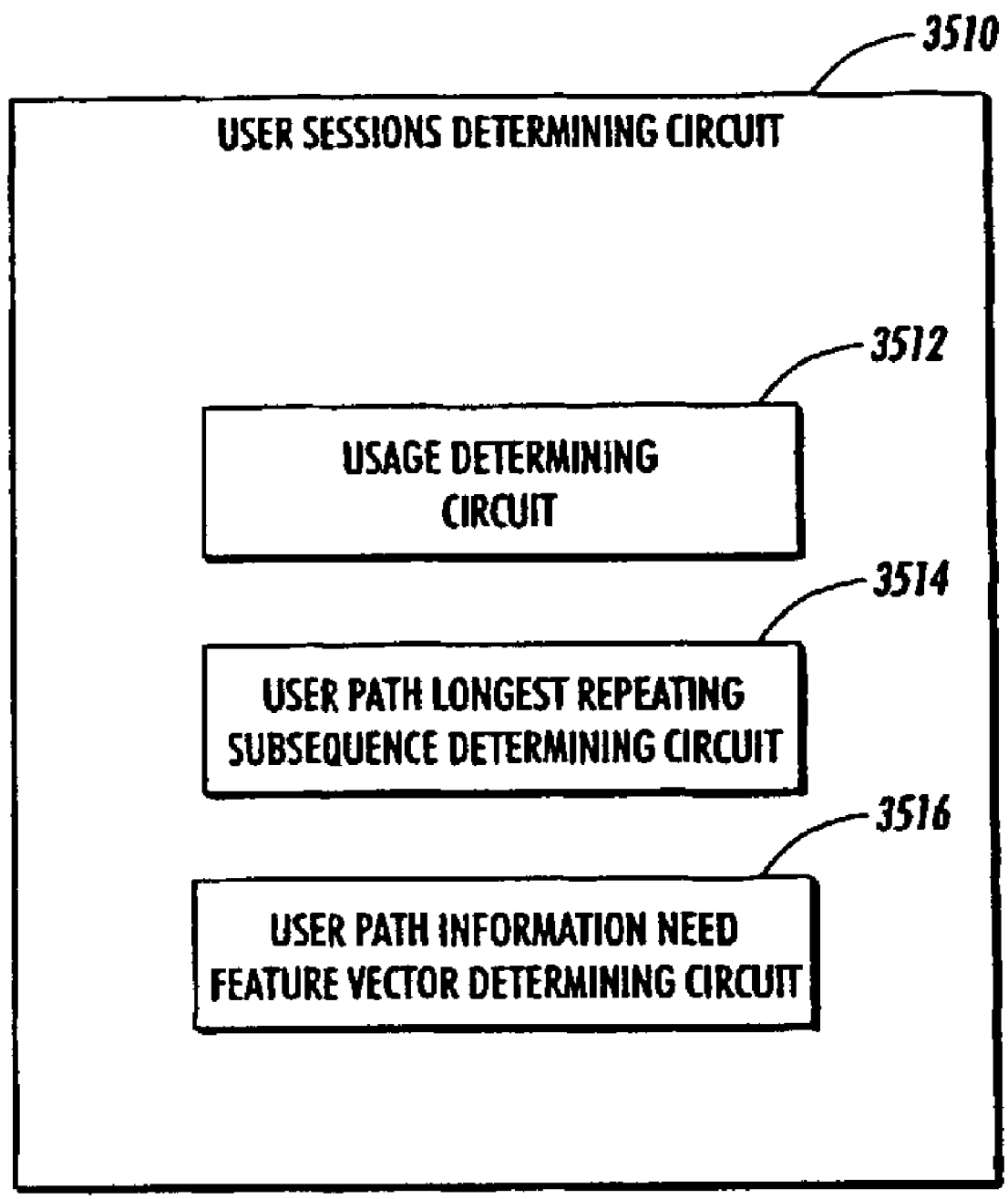
FIG. 9 is an exemplary embodiment of a user sessions determining circuit according to this invention.

FIG. 9 shows in greater detail one exemplary embodiment of the user sessions determining circuit 3510 according to this invention. The user sessions determining circuit 3510 includes a usage determining circuit 3512, a user path longest repeating subsequence determining circuit 3514 and a user path information need feature vector determining circuit 3516.

The usage determining circuit 3512 determines the user path traversals of the document collection or web site 420, from the document server or web server 400 access log information. The document server or web server 400 access information contains information about each machine that has accessed the document collection or web site 420 through document server or web server 400.

The user paths are transferred to the user path longest repeating subsequence determining circuit 3514. The longest repeating subsequence is the longest user traversal of a set of connected documents or web pages. The determination of longest repeating subsequence filters out less relevant or less important information to facilitate the identification of significant user paths from the user path information.

The user path longest repeating subsequence circuit determining circuit 3514 identifies user paths that exceed the threshold level and which are the longest subsequences. These identified paths are then stored in memory circuit 330 as determined usage information.

The user path information need feature vector determining circuit 3516 is activated to identify the information need keywords associated with a user path using the techniques described in co-pending U.S. patent application Ser. No. 09/540,063, which is incorporated herein by reference in its entirety. The user path information need feature vector determining circuit 3516 stores the information need keyword information in the memory circuit 330 indicating the most relevant keywords for the user path.

Figure 10:
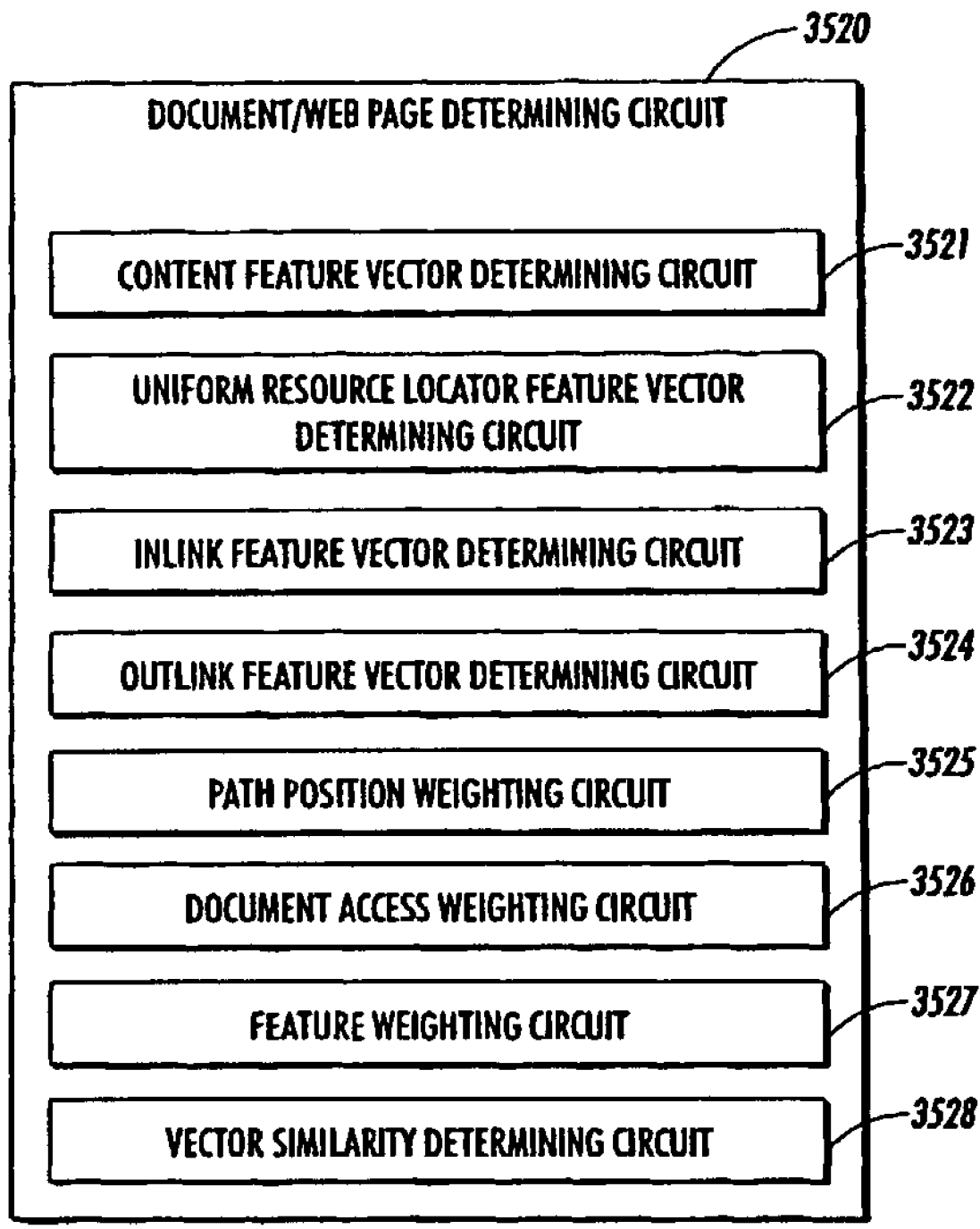
FIG. 10 is an exemplary embodiment of a document/web page determining circuit according to this invention.

FIG. 10 shows in greater detail one exemplary embodiment of the document/web page determining circuit 3520 according to this invention. The document/web page determining circuit 3520 includes a content feature vector determining circuit 3521, a uniform resource locator (URL) feature vector determining circuit 3322, an inlink vector determining circuit 3523, an outlink vector determining circuit 3524, a path position weighing circuit 3525, a document access weighting circuit 3526, a feature weighting circuit 3527 and a vector similarity determining circuit 3528.

The content feature vector determining circuit 3521 breaks each retrieved document or web page of the document collection or web site 420 into constituent words. The URL feature vector determining circuit 3522 determines the features of the uniform resource locators that appear in each document or web page.

The inlink vector determining circuit 3523 determines the inlinks or inward URLs that refer to the current document or web page in the document collection or web site 420. For example, the topology matrix of the document collection or web site 420 may be examined to determine which documents or web pages contain connections or links to the current document or web page. Since URLs may refer to a specific paragraph within a document or web page, each of the referring documents or web pages is analyzed to determine the URL including any paragraph information. Also, since the inlink may reference a relative URL instead of a full path, the inlink feature vector determining circuit 3523 determines the full path of the URL so that a fully normalized weighting of the URL may be determined. The inlink vector determining circuit 3523 then determines an inlink feature vector from the relevant weighting of the URLs.

The outlink vector determining circuit 3524 determines the outlinks or outward URLs that are referred to by the current document or web page in the document collection or web site 420. It will be apparent that the outlink feature vector determining circuit 3524 may be activated before, after or at the same time as the content feature vector determining circuit 3521 is activated.

The user path information need feature vector determining circuit 3516 is activated to identify the information need keywords associated with a user path using the techniques described in co-pending U.S. patent application Ser. No. 09/540,063, filed Mar. 31, 2000, which is incorporated herein by reference in its entirety. The user path information need feature vector determining circuit 3516 stores the information need keyword information in the memory circuit 330 indicating the most relevant keywords for the user path.

The document access weighting circuit 3526 determines how frequently the user path document or web page has been accessed based on the determined usage information stored in the memory circuit 330. It will be apparent that any type of access weighting may be used in accordance with this invention.

The feature weighting circuit 3527 allows the user to select a weighting for the proximal cue feature vector, the content feature vector, the URL feature vector, the inlink feature vector, the outlink feature vector and the user path information need feature vector. Any method of selecting a weighting may be used, including but not limited to a drop down dialog box to select an entry, a text entry box or any other known or later developed technique for making selections.

The vector similarity determining circuit 3528 selects the similarity function that is used to define similarity between any of the vectors. In various exemplary embodiments, the similarity function is a combination of the similarity functions for the proximal cue feature vector, the content feature vector, the URL feature vector, the inlink feature vector, the outlink feature vector and the information need feature vector after the feature weights have been applied. In various embodiments, any or all of bases for determining similarity between the proximal cue feature vector, the content feature vector, the uniform resource locator feature vector, the inlink feature vector, the outlink feature vector and the information need feature vector may be changed. As discussed above, any technique for selecting a similarity function may be used, including but not limited to, drop down dialog boxes, text entry pop-up boxes or any other known or later developed technique.

Once the user sessions determining circuit 3510 determines user activity in the document collection or web site and the document/web page determining circuit 3520 determines the document collection or web site content, the user profile determining circuit 350 builds a user profile for each user session.

Figure 11:
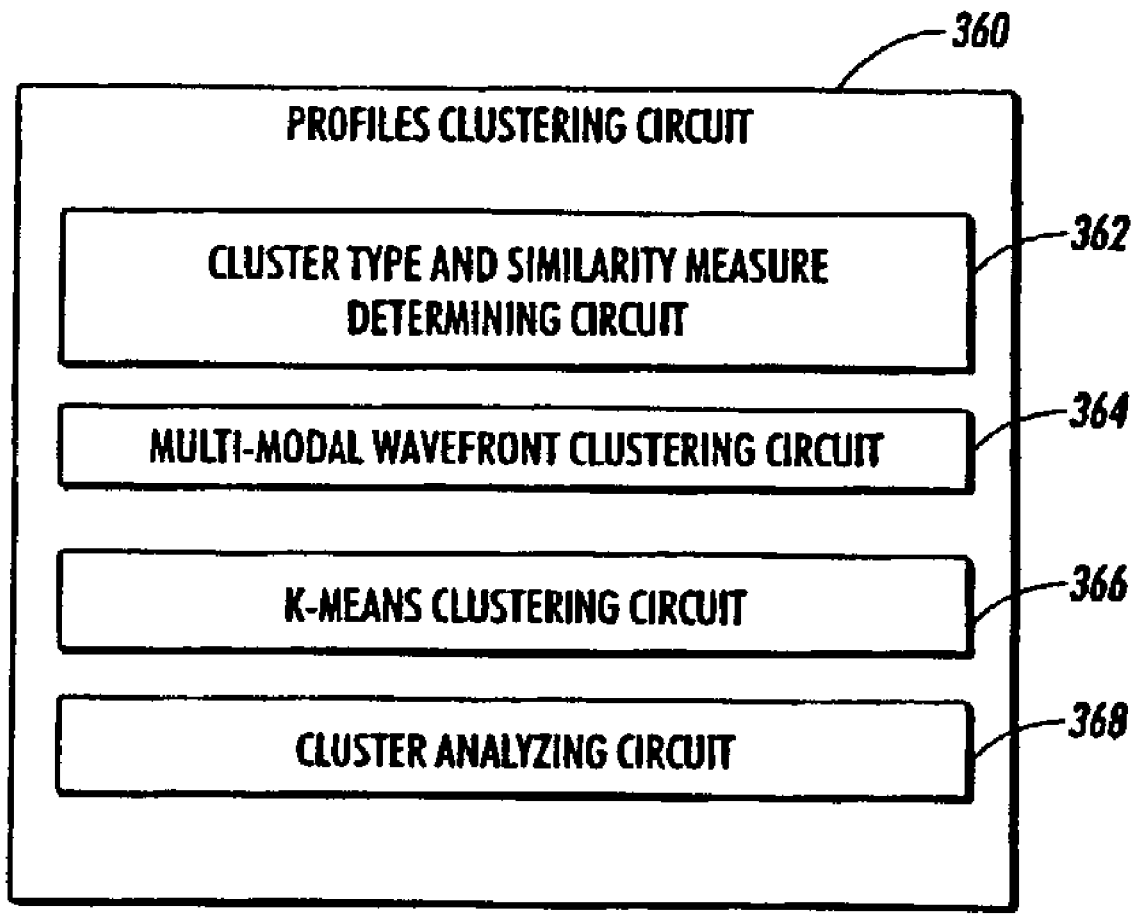
FIG. 11 is an exemplary embodiment of a profiles clustering circuit according to this invention.

FIG. 11 shows one exemplary embodiment of a profiles clustering circuit 360 according to the invention. The profiles clustering circuit 360 includes a cluster type and similarity measure determining circuit 362, a multi-modal Wavefront clustering circuit 364 and/or a K-Means clustering circuit 366 and a cluster analyzing circuit 368.

The cluster type and similarity measure determining circuit 362 determines what type of multi-modal clustering has been selected and determines the required measure of similarity between vectors. The cluster type and similarity measure determining circuit 362 allows the user to identify user types using multi-modal clustering to over-ride the default or pre-set multi-modal clustering setting. The cluster type and similarity measure determining circuit 362 also provides the user the ability to set the required measure of similarity. For example, Wavefront multi-modal clustering with a measure of similarity of 0.7 may be the default. The similarity measure of 0.7 reflects the measure of similarity that must be determined between two vectors for the vectors to be clustered together. If required, the user may override the Wavefront cluster type to select K-Means multi-modal clustering instead. Differing measures of similarity may also be selected. The selection may be via a pop-up dialog box, text entry or any other known or later developed technique. It will also be apparent that any type of multi-modal clustering known or later developed may be used in the practice of this invention.

If multi-modal Wavefront clustering is selected the wavefront clustering circuit 364 is activated. Wavefront clustering begins with the accumulated determined user paths represented by the weighted vectors. The Wavefront clustering circuit 364 determines a global centroid vector. Random vectors are then determined. Cluster centers are selected between the global centroid and the random vectors. The average of vectors having the selected measure of similarity with the cluster centers based on the selected multi-modal similarity function is determined and stored in the memory circuit 330.

If the K-Means clustering is selected, the K-Means clustering circuit 366 is activated and K-Means clustering begins with the accumulated user paths represented by the weighted vectors. Random vectors are selected as cluster centers. The average of vectors having the selected measure of similarity with the cluster centers based on the selected multi-modal similarity function is determined and stored in the memory circuit 330.

The cluster analyzing circuit 368 is activated to determine user types based on the clustered multi-modal user path information. For example, based on the average multi-modal clustering information, a set of information need keywords may be identified from the averaged multi-modal information cluster vector. These information need keywords describe the user types accessing the document collection or web site.

In the various exemplary embodiments outlined above, the system 300 for clustering user sessions using multi-modal information and proximal information can be implemented using a programmed general purpose computer. However, the system 300 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIGS. 3–6 can be used to implement an embodiment of the invention.

Each of the circuits 310–380 of the system 300 can be implemented as portions of a suitably programmed general purpose computer. Alternatively, circuits 310–380 of the system 300 outlined above can be implemented as physically distinct hardware circuits within an ASIC, or using a FPGA, a PDL, a PLA or a PAL, or using discrete logic elements or discrete circuit elements. The particular form each of the circuits 310–380 of the system 300 outlined above will take is a design choice and will be apparent to those skilled in the art.

Moreover, the system 300 and/or each of the various circuits discussed above can each be implemented as software routines, managers or objects executing on a programmed general purpose computer, a special purpose computer, a microprocessor or the like. In this case, the system 300 and/or each of the various circuits discussed above can each be implemented as one or more routines embedded in the communications network, as a resource residing on a server, or the like. The system 300 and the various circuits discussed above can also be implemented by physically incorporating the system 300 into a software and/or hardware system, such as the hardware and software systems of a document server, web server or electronic library server.

As shown in FIG. 3, the memory circuit 330 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 410 can each be any known or later developed device or system for connecting a communication device to the system 300, including a direct cable connection, a connection over a wide area network or a local area network, a connection over an intranet, a connection over the Internet, or a connection over any other distributed processing network or system. In general, the communication link 410 can be any known or later developed connection system or structure usable to connect devices and facilitate communication.

Further, it should be appreciated that the communication link 410 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer implemented method for clustering user sessions using multi-modal information and proximal information, comprising:
   selecting a plurality of user paths in a collection of content portions, and for each user path:
   determining multi-modal information for content portions associated with the user path;
   determining proximal information for content portions associated with the user path;
   combining the multi-modal information for content portions and the proximal information for content portions associated with the user path to form a user profile having a unified representation; and
   clustering multi-modal information and proximal information of user profiles based on similarity.

2. The method of claim 1, wherein determining proximal information includes;
   analyzing portions of a text associated with a link between content portions along the user path.

3. The method of claim 1, wherein determining proximal information includes;
   analyzing portions of a text associated with an image link between content portions along the user path.

4. The method of claim 1, further comprising:
   using longest repeating subsequence to select the plurality of user paths.

5. The method of claim 1, further comprising:
   using vectors to represent multi-modal information and proximal information.

6. The method of claim 5, further comprising:
   weighting the vectors representing multi-modal information; and
   weighting the vectors representing the proximal information.

7. The method of claim 1, further comprising:
   weighting content portion in the user path based on access frequency of the content portion.

8. The method of claim 1, further comprising:
   weighting content portion in the user path based on a position of the content portion in the user path.

9. The method of claim 1, wherein clustering the multi-modal information and the proximal information is performed using at least one of K-Means clustering and Wavefront clustering.

10. A computer system to cluster user sessions using multi-modal information and proximal information, comprising:
    a user path determining circuit that selects a plurality of user paths in a collection of content portions;
    a multi-modal information determining circuit that determines multi-modal information for content portions associated with the user path;
    a proximal information determining circuit that determines proximal information for content portions associated with the user path;
    a similarity determining circuit that combines the multi-modal information for content portions and the proximal information for content portions associated with the user path to form a user profile having a unified representation; and
    a cluster and similarity measure determining circuit that clusters multi-modal information and proximal information of user profiles based on similarity.

11. The system of claim 10, wherein the proximal information determining circuit analyzes portions of a text associated with a link between content portions along the user path.

12. The system of claim 10, wherein the proximal information determining circuit analyzes portions of a text associated with an image link between content portions along the user path.

13. The system of claim 10, wherein the user path determining circuit selects user paths using the longest repeating subsequences.

14. The system of claim 10, wherein the multi-modal information determining circuit includes at least one of;
    a content feature determining circuit that determines contents of content portions associated with the user path;
    a uniform resource locator feature determining circuit that determines uniform resource locators of content portions associated with the user path;
    an inlink feature determining circuit that determines inlinks of content portions associated with the user path; and
    an outlink feature determining circuit that determines outlinks of content portions associated with the user path.

15. The system of claim 10, further comprising:
    an information weighting circuit that weights the multi-modal information and the proximal information.

16. The system of claim 10, further comprising:
    a content portion access frequency weighting circuit that weights at least one content portion associated with the user path based on access frequency.

17. The system of claim 10, further comprising:
    a path position weighting circuit that weights at least one content portion associated with the user path based on the position of the content portion within the user path.

18. The system of claim 10, where the cluster and similarity measure determining circuit clusters multi-modal information and proximal information using at least one of K-Means clustering and Wavefront clustering.

* * * * *